United States Patent
Cook et al.

(10) Patent No.: US 9,009,544 B2
(45) Date of Patent: Apr. 14, 2015

(54) USER OPERATION HISTORY FOR WEB APPLICATION DIAGNOSTICS

(71) Applicant: Oracle International Corporation, Redwood Shores, CA (US)

(72) Inventors: Gregory Cook, Berkshire (GB); Wai Jan, Portland, OR (US); Bruce Irvin, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 147 days.

(21) Appl. No.: 13/852,982

(22) Filed: Mar. 28, 2013

(65) Prior Publication Data

US 2014/0298093 A1  Oct. 2, 2014

(51) Int. Cl.
*G06F 11/00* (2006.01)
*G06F 11/36* (2006.01)
*G06F 11/07* (2006.01)

(52) U.S. Cl.
CPC ............ *G06F 11/36* (2013.01); *G06F 11/3664* (2013.01); *G06F 11/3696* (2013.01); *G06F 11/0769* (2013.01)

(58) Field of Classification Search
CPC ............ G06F 11/0769; G06F 11/0775; G06F 11/0787; G06F 11/3664; G06F 11/3668; G06F 11/3684; G06F 11/3688; G06F 11/3696
USPC .................. 714/26, 27, 32, 33, 38.14, 46, 48; 715/745; 379/9.02, 9.03, 9.04
See application file for complete search history.

(56) References Cited

U.S. PATENT DOCUMENTS

| | | | |
|---|---|---|---|
| 6,549,944 B1 * | 4/2003 | Weinberg et al. | 709/224 |
| 7,849,364 B2 * | 12/2010 | Callender | 714/38.1 |
| 8,327,271 B2 * | 12/2012 | Miller | 715/738 |
| 8,601,323 B2 * | 12/2013 | Tsantilis | 714/42 |
| 2002/0035498 A1 * | 3/2002 | Kehoe et al. | 705/8 |
| 2002/0038388 A1 * | 3/2002 | Netter | 709/318 |
| 2008/0320343 A1 * | 12/2008 | Eickmeyer et al. | 714/57 |
| 2009/0193298 A1 * | 7/2009 | Mukherjee | 714/38 |
| 2009/0207749 A1 * | 8/2009 | Roskowski | 370/252 |
| 2009/0228805 A1 * | 9/2009 | Ruehle | 715/745 |
| 2010/0229112 A1 * | 9/2010 | Ergan et al. | 715/764 |
| 2011/0276843 A1 * | 11/2011 | Echevarria et al. | 714/55 |
| 2012/0023475 A1 * | 1/2012 | Surazski et al. | 717/100 |
| 2013/0086554 A1 * | 4/2013 | Huggins | 717/124 |

* cited by examiner

*Primary Examiner* — Marc Duncan
(74) *Attorney, Agent, or Firm* — Trellis IP Law Group, PC

(57) ABSTRACT

A system and method for diagnosing an error during a user operation in a web application. An example method is executed, at least in part, by a server system, wherein the server system also executes, at least in part, a web application. The example method includes recording user operations during a user's interaction with the web application; storing the user operations in a click history record in a primary memory device; determining that an error has occurred during the user's interaction with the web application; in response to the determining, transferring at least a portion of the click history record to a secondary memory device; including correlation information in association with the click history; identifying at least one other record by using the correlation information; and providing the click history record and the at least one other record to analysis software and accompanying user interface display screen so that the error can be diagnosed.

20 Claims, 3 Drawing Sheets

Incident File Usage History Dump Record
(e.g., click history record format for a usage event,
e.g., a click on a UI control) ← 150

| Value | Description |
|---|---|
| Time Stamp | Time stamp |
| Username | Username |
| Application Name | Application name |
| Thread ID | Java thread ID |
| Execution Context ID (ECID) | Unique ID per web request |
| Session ID | Unique ID per web request |
| UI Component ID | Internal UI component ID* |
| UI Component Display Name | UI Comp. Display Name as See by User |
| UI Component Type | Type of UI component (e.g., button) |
| UI Click Type | Type of UI operation (e.g., action) |
| UI Window ID | Internal UI window ID* |
| UI View ID | Internal UI view ID* |
| UI Region ID | Internal UI region ID* |
| UI Region Name | Internal UI region name* |

FIG. 2

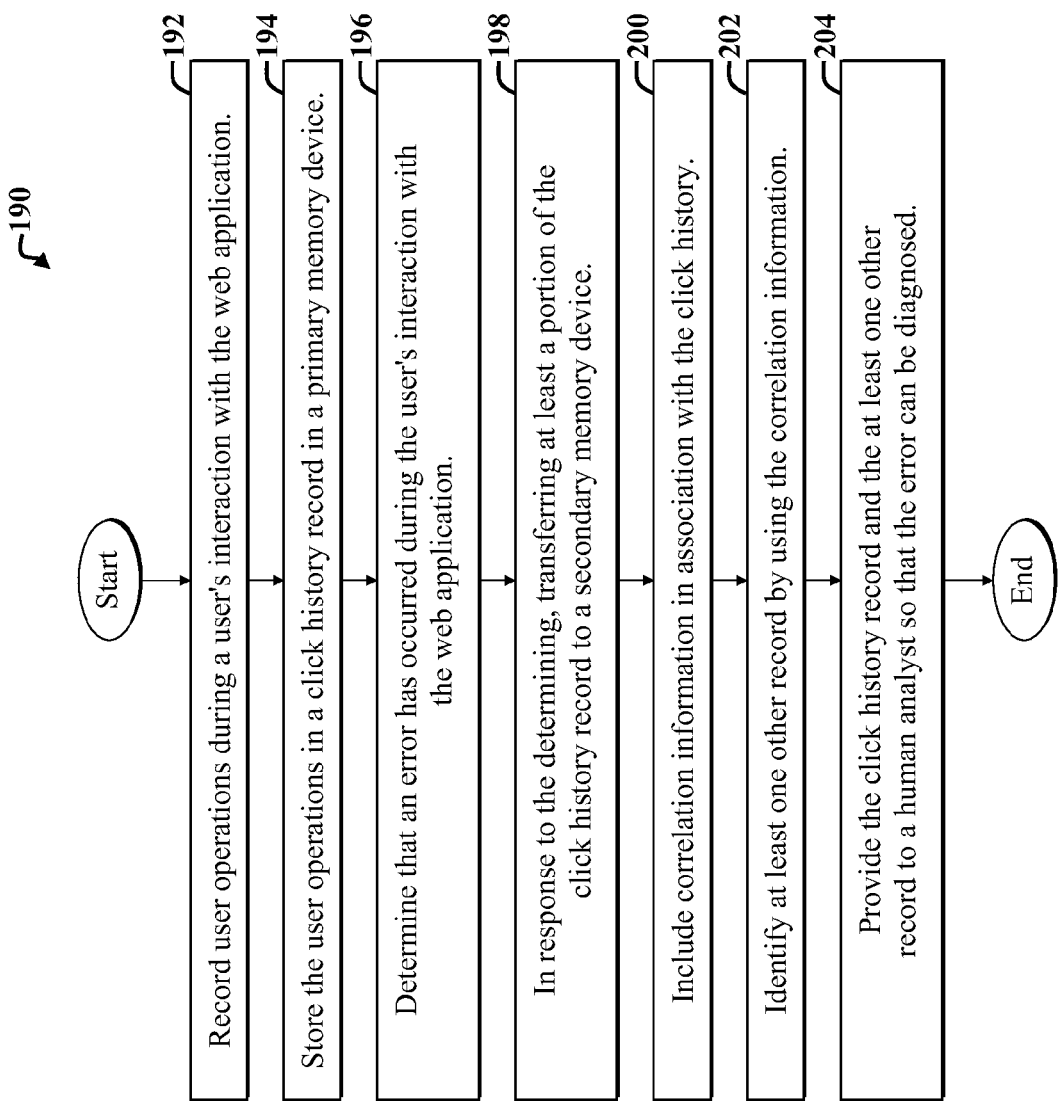

USER OPERATION HISTORY FOR WEB APPLICATION DIAGNOSTICS

BACKGROUND

The present application relates to software and more specifically to software and accompanying systems and methods for facilitating detecting, diagnosing, and/or analyzing software errors, such as bugs.

Systems and methods for facilitating troubleshooting and resolving software errors are employed in various demanding applications, including programming language compilers and accompanying code debuggers, web server performance analysis tools, and so on. Such applications demand accurate and informative methods for detecting and characterizing software errors to facilitate resolution.

Effective and informative tools for diagnosing software errors are particularly important for diagnosing errors and related problems occurring in complex systems, such as large Service Oriented Architectures (SOAs), where software error information may be incomplete and dispersed among multiple systems. For example, in certain SOA computing environments, a given web application may call many web services, and the exact web service that triggered the software error can be difficult to ascertain.

Conventionally, when a software error is encountered by an end user or software proprietor, the end user and/or proprietor may contact each other to discuss the user's activity when the software error occurred. However, the user may not recall exactly what they were doing when a particular error occurred.

Furthermore, verbally describing a software error can be time consuming, inaccurate, and inefficient. Important details may be forgotten before the user speaks with customer support personnel (e.g., the software proprietor). Furthermore, the user may be unaware of exactly what the user did that resulted in the error.

Alternatively, certain software applications include functionality for automatically presenting a dialog box when an error occurs. The dialog box may provide one or more fields for accepting user descriptions of the error and accompanying circumstances. However, such features often do not yield sufficient information to enable efficient error diagnosis and correction.

In general, industry solutions provide insufficient information to enable efficient software error diagnosis and resolution, especially in complex computing environments. Furthermore, existing solutions are often characterized by a collection of disparate tools, which may further complicate software error diagnosis and resolution.

SUMMARY

An example method for facilitating characterizing a software error includes tracking and storing information pertaining to usage history of a web application; detecting a software error event associated with the web application, and providing a signal in response thereto; and outputting stored usage history information in response to the signal.

In a more specific embodiment, the outputting step includes outputting stored usage history information to an incident file that is accessible to error analysis software. The usage history information includes one or more records characterizing a particular user interaction with a web application. The one or more records includes an Execution Context Identification Number (ECID) and one or more items identifying a web application associated with the particular user interaction. The one or more items include a user interface identification numbers, including component, window, view, and region identification numbers.

Usage history information is stored for a specific time interval, which may be determined based on a size of a configurable buffer used to store the usage history information. The buffer may be a circular buffer or other First-In-First-Out (FIFO) buffer of specific size.

A usage history controller module, also called a click-history module, communicates with the configurable buffer and is adapted to enable an administrator or other authorized (credentialed) user to adjust the buffer size for one or more end users of one more web applications communicating with the usage history controller.

In the specific embodiment, the retrieving step includes retrieving usage history information from the buffer and storing the usage history in an incident file or incident file repository. The incident file is accessible to one or more error analysis tools, including software adapted to enable correlating usage history information with additional diagnostics information.

An ECID associated with usage history information and further associated with the additional diagnostics information is employed to match, i.e., correlate, the usage history information with the additional diagnostics information. The additional diagnostics information may include, for example, a thread dump, a server diagnostic error log, a metrics dump, performance data associated with the server system, server access logs, and so on.

Hence, certain embodiments discussed herein are adapted to enable storage of detailed software operation history, e.g., "click history," which may describe or characterize user web activity prior to and during an error condition. Administrators, developers, customer support representatives, and so on, may employ software diagnosis and error correction software to access the activity information (i.e., usage history information) to rapidly characterize, diagnose, and correct software errors, i.e., bugs, occurring in web applications.

Furthermore, certain embodiments discussed herein may be implemented via configurable server-side usage tracking and error reporting functionality, where buffer sizes may be tuned to enhance system performance and reduce requisite computing resources (e.g., memory) for implementing the system.

In summary, certain embodiments discussed herein provide a non-intrusive way to record "user clicks," i.e., user interactions with web applications occurring near and during an error event, which when combined with additional diagnostics data captured for the same event, may substantially facilitate error diagnosis and resolution. This may reduce potentially time consuming interactions between customers and software proprietors.

A further understanding of the nature and the advantages of particular embodiments disclosed herein may be realized by reference of the remaining portions of the specification and the attached drawings.

BRIEF DESCRIPTION OF THE DRAWINGS

FIG. 2 illustrates an example format of a usage history record of an incident file generated by the system of FIG. 1.

FIG. 3 is a flow diagram of an example method adapted for use with the embodiments of FIGS. 1-2.

DETAILED DESCRIPTION OF EMBODIMENTS

Figure 1:
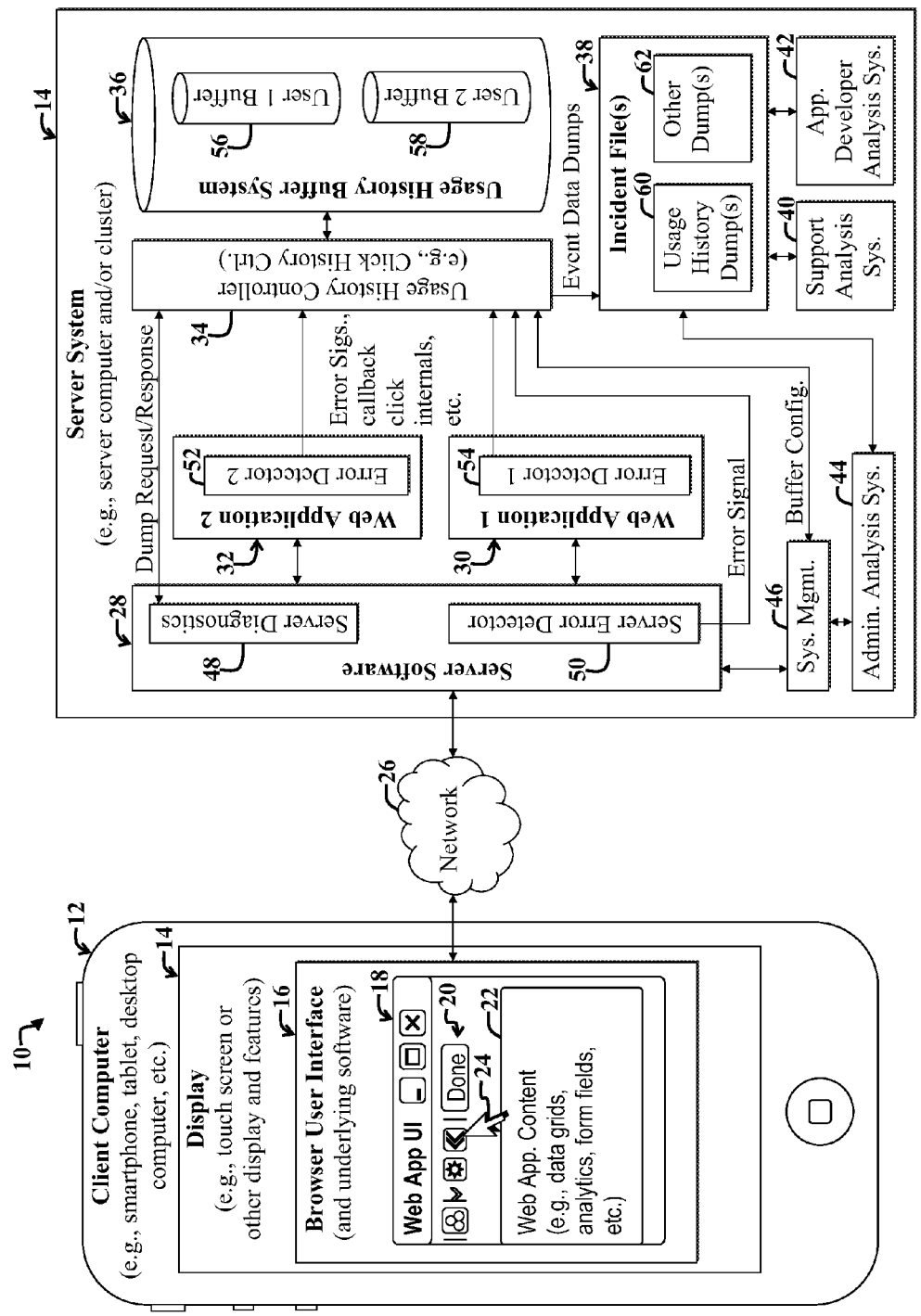
FIG. 1 is a diagram illustrating an example computing environment and accompanying system for facilitating detecting and characterizing a software error.

For clarity, certain well-known components, such as hard drives, processors, operating systems, power supplies, routers, Internet Service Providers (ISPs), databases, and so on, have been omitted from the figures. However, those skilled in the art with access to the present teachings will know which components to implement and how to implement them to meet the needs of a given implementation.

FIG. 1 is a diagram illustrating an example computing environment and accompanying system 10 for facilitating detecting and characterizing a software error. For the purposes of the present discussion, software error, also called a bug or software-related error, may be any condition triggered by use of software, where the condition is characterized by an interference or interruption of a software operation or that otherwise causes problematic software activity, e.g., an error. In the present example embodiment, the system 10 is adapted to collect information (e.g., pertaining to end user web application usage history) and characterize one or more errors associated with one or more web applications, as discussed more fully below.

The example system 10 includes a client computer 12 in communication with a server system 14 via a network 26, such as the Internet. The client computer 12 is adapted to access functionality provided by one or more web applications, such as a first web application 32 and a second web application 30, hosted by a server, such as the server system 14.

For the purposes of the present discussion, functionality may include any function or set of functions, actions, operations, mechanisms for performing a task via software and may further include any user interface controls, or features and any hardware or software module, device component, and so on, that performs or otherwise enables one or more functions, capabilities, or tasks.

A user interface control may be any displayed element or component of a user interface display screen, which is adapted to enable a user to provide input, view data, and/or otherwise interact with a user interface. Additional examples of user interface controls include buttons, drop-down menus, menu items, tap-and-hold functionality, and so on. Similarly, a user interface control signal may be any signal that is provided as input for software, wherein the input affects a user interface display screen and/or accompanying software application associated with the software.

The client computer 12, which may be implemented via a smartphone, tablet, desktop computer, or other computing device, runs a software client, e.g., a browser characterized by browser User Interface (UI) display screen 16 presented on a display 14 of the client computer 12.

In the present example embodiment, the browser UI display screen 16 illustrates a web application user interface section 18, i.e., window, which includes content generated via a web application hosted by the server system 14.

For the purposes of the present discussion, a web application may be any computer code, e.g., a software application, that is adapted to be accessed by one or more client devices over a network, such as the Internet or an intranet. A web application may call and/or implement one or more web services. A web service may be any software function or operation activated or implemented via software running on a server in response to a signal, e.g., a request message, sent from a client to the server via a network, such as the World Wide Web. The software that implements a web service operation may also be called a web service, software service, or simply service herein.

Generally, web applications may be implemented via various methods and accompanying mechanisms, such as Java, JavaScript, Flash, Silverlight, and so on. Furthermore, certain web applications may be defined by a process template that executes several processes, where each process is implemented via a separate web service.

Generally, software services provide functionality, e.g., capabilities, that may be reused by different applications or processes (that may be distributed across a network), which access the functionality via a predetermined interface, e.g., as specified via middleware, and consistent with a service description.

The example web application UI window 18 is rendered in part by the browser based on instructions retrieved by the client device 12 from one or more of the server-side web applications 30, 32 in response to one or more request messages sent to the server system 14. The web application UI window 18 includes example user interface controls 20, 22, including content 22, such as forms, data grids, and analytics, widgets, and so on.

An example request message includes a Uniform Resource Locator (URL) sent over a network via HyperText Transfer Protocol (HTTP). Another example message includes an eXtensible Markup Language (XML) message sent in accordance with Simple Object Access Protocol (SOAP). Note that web applications and/or web services may be written in various languages, such as Web Services Description Language (WSDL), Java, and so on.

The server system 14 may represent a type of Service Oriented Architecture (SOA) server. For the purposes of the present discussion, an SOA server may be any server that is adapted to facilitate providing application functionality, e.g., services, accessible to one or more client computers coupled to a network. A server may be any computing resource, such as a computer and/or software that is adapted to provide content, e.g., data and/or functionality, to another computing resource or entity that requests it, i.e., the client. A client may be any computer or system that is adapted to receive content from another computer or system, called a server.

The server system 14 includes server software 28 in communication with the first web application 30, second web application 32, system management software 46, and a usage history controller 34. The usage history controller 34 communicates with and is adapted to facilitate controlling a usage history buffer system 36, also called a click-history buffer system. The example usage history buffer system 36 includes a first user buffer 56 and a second user buffer 58.

The usage history controller 34 further communicates with the web applications 30, 32, a server diagnostics module 48 included in the server software 28, a server error detector 50 included in the server software 28, the system management module 46, and an incident file repository 38.

For the purposes of the present discussion, usage history information (also simply called usage history herein) may be any collection of information characterizing end user interaction, e.g., user input, with software. The user input may include mouse clicks, touch input, voice input, and other types of input events applied to particular user interface controls or features, such as dialog boxes, menus, form entry fields, widget controls, and so on. Usage history information may include items, e.g., records, where each item provides information characterizing user input or other interaction with software, as discussed more fully below.

The example incident file repository 38 includes one or more usage history dumps 60 and one or more other dumps 62. A dump may be any information, such as usage history, output from a buffer or other memory, such as the first user buffer 56 and/or second user buffer 58, in response to a signal, such as an error signal sent from one or more of the web applications 30, 32.

The other dumps 62 may include various server diagnostics information, e.g., as generated and/or maintained by the server diagnostics module 48. The server diagnostics module 48 includes computer code for monitoring and storing information pertaining to server system operations, resources, capabilities, and so on. Examples of other dumps, which may be stored among the incident files 38, include a server thread dump, server diagnostic error logs, one or more metrics dumps, server performance data, and server access logs.

For the purposes of the present discussion, a thread dump may be any log or collection of information pertaining to software threads running on a server at a particular time or during a particular time interval, such as when a software error event occurs.

A metrics dump may include measurements and statistics, such as measures of how many records are being stored in a given buffer 56, 58, the oldest time stamp of a record in a buffer, buffer size, and so on. The metrics may also include server metrics, such as the number and type of database connections (also associated with ECIDs) maintained between the web applications 30, 32 (and/or server software 28) and a database. The metrics may also include performance measurements characterizing the performance and overall health of the server system 14, and so on. In general metrics may be any descriptive measurements and/or parameters characterizing the server system 14 and/or one or more components thereof.

The other dumps 62 may also include additional information, e.g., specifying the number of request messages sent from a client to a server in response to user input, and other descriptive information characterizing an end user interaction with a web application.

Data comprising such dumps, e.g., other dumps 62, may be retrieved from the server diagnostics module 48 and/or web applications 30, 32 by the usage history controller 34 and then input to the incident files 38 in response to receipt of an error detection signal by the usage history controller 34. Alternatively, data comprising the other dumps may be dispatched directly to the incident file repository 38 in response to error detection by the modules maintaining the other dump information.

Hence, the incident file repository 38 contains dumps 60, 62, which may be used, e.g., in combination with analysis tools 40-42, to diagnose software errors and related events, including logs, click history, Java Virtual Machine (JVM) data, and so on. In addition, the dumps 60, 62 include context data, e.g., username, session ID, time stamp, and so on, associated with a particular software error event. Usage history information 60, e.g., click data, can be correlated with other dumps 62 via ECID, session ID, and so on, to determine what errors were logged for a particular click or end user interaction with a web application.

The web applications 30, 32 include computer code for publishing events, including software error events, which are accessible to the usage history controller 34. The usage history controller 34 is adapted to monitor, track, and store user interaction with the web applications 30, 32, such as clicks on (or user selections of) user interface controls 20 of the web application user interface window 18 (e.g., via a mouse 24).

When one of the web applications 30, 32 encounters an error, an error signal may be sent to the usage history controller 34. Similarly, any software errors detected via the server error detector module 50 may cause an error signal to be output to the usage history controller 34. The usage history controller 34 includes computer code, e.g., switching functionality, for responding to the error signal by triggering a dump of one or more of the buffers 56, 58 to the incident file repository 38. The usage history controller 34 may also respond to an error signal by triggering other dumps 62 from the server diagnostics module 48 and/or from elsewhere in the server system 14.

Note that modules other than the server diagnostics module 48 may be employed to populate the incident file repository 38 in response to detection of a software error event, without departing from the scope of the present teachings. For example, concurrently running debugging tools and additional software may be readily adapted to communicate with the usage history controller and/or incident file repository 38 and to be responsive to errors occurring within the server system 14 and/or other server systems in communication with the server system 14.

Various types of analysis tools, including a customer support analysis system 40, an application developer analysis system 42, and an administrator analysis system 44 may communicated with the incident file repository 38. The analysis tools 40-44 may include computer code for correlating, i.e., matching, usage history dumps 60 with other dumps 62 based on common ECIDs, time stamps, and so on, when an error event is detected (e.g., via server error detector 50 and/or web application error detectors 52, 54).

Each of the analysis tools 40-44, which may be operated by human administrators, customer support personnel, developers, and so on, include authentication functionality for enabling authorized personnel to log in and access the incident file repository 38 to facilitate software error diagnosis and resolution. For the purposes of the present discussion, an incident file may be any collection of information pertaining to one or more software error events, e.g., occurrences of a bug.

The administrator analysis system 44 includes computer code for selectively employing the system management module 46 to configure the usage history controller 34 and/or accompanying usage history buffer system 36. For example, the administrator analysis system 44 may receive administrator user input specifying an adjustment to the size of the first buffer 56. The system management module 46 then adjusts the size of the first buffer 56 in response to a corresponding buffer adjustment signal from the administrator analysis system 44.

The system management module 46 may be implemented in middleware. For the purposes of the present discussion, middleware may be any computer code that facilitates interfacing software and/or accompanying devices, thereby facilitating communications therebetween. Middleware may facilitate client-server communications, operating system-application communications, and so on.

Each of the software error analysis tools 40-44 may include computer code for enabling correlating usage history information, e.g., as maintained in the usage history dumps 60, with additional diagnostics information, e.g., as represented by the other dumps 62. The computer code may reference an ECID associated with usage history information and associated with the additional diagnostics information to match the usage history information with the additional diagnostics information.

Furthermore, note that a given error event triggered during a given end user interaction with a web application user interface element (e.g., user interface control or feature) may also be correlated with (i.e., matched with) one or more similar error events previously logged by the same or different end user. The correlating of different software error event data enables collection or aggregation of information pertaining to an error event from multiple error reporting and information reporting mechanisms, thereby facilitating integrating information into the incident file repository 38 to facilitate software error diagnosis and resolution.

In an example scenario, a first user employs the client computer 12 to interact with a website via the browser user interface 16, which displays a web application user interface component, e.g., window 18. While performing various interactions, e.g., clicks, in the web application window 18, an error in the underlying web application, e.g., the first web application 30, occurs. The first error detector 54 of the first web application 30 then publishes an error signal, which is read by the usage history controller 34.

The usage history controller 34 then triggers a dump of the first user buffer 56 to the incident file repository 38. The first user buffer 56 includes a predetermined amount of usage history, depending upon the configured size of the buffer 56. A current usage history record characterizing the incident, e.g., click that triggered the error is included in the usage history dump 60 along with previously stored usage history and associated click records.

Note that the amount of data stored in a buffer, such as the first user buffer 56, leading up to an error event may represent a time interval determined by a predetermined administrator-configurable number of interactions, e.g., end user clicks in the web application window 18, corresponding to the size of the buffer 56.

The usage history buffers 56, 58 may be implemented as circular buffers or other First-In-First-Out (FIFO) buffers with administrator-configurable sizes. For the purposes of the present discussion, a buffer may be any data structure that is adapted to store or cache items of data. A FIFO buffer may be any buffer with a size limit such that when the buffer is full, adding a new data item to the buffer results in removal of or overwriting of the oldest data item in the buffer. When items are removed from the buffer or overwritten, older items are removed or overwritten before newer items are removed or overwritten The usage history controller 34 may transfer information from the server diagnostics module 48 to the incident file repository 38. Alternatively, information from the server diagnostics module 48 is dumped directly to the incident file repository 38.

After the incident file repository 38 is populated with usage history dumps 60 and other dumps 62, the software error analysis tools 40-44 may be employed by support personnel to analyze the data and resolve or otherwise characterize or diagnose the associated software error. For the purposes of the present discussion, support personnel may refer to any user or entity tasked with diagnosing and/or correcting a software error, also called bug. Examples of support personnel include developers, system administrators, customer support representatives, and so on.

Note that in cases where web application source code information associated with a given software error event is included in the incident file repository 38, then additional modules, such as user interface reconstruction modules, may be employed to graphically recreate representations of the web application 18 at the time of the detected error event to further facilitate error diagnosis and resolution. A user interface reconstruction may also include playback functionality for enabling playback of an end user's usage history for a time interval determined by the length of the associated buffer 56, 58.

In summary, the system 10 is adapted to facilitate characterizing a software error by tracking and storing information pertaining to usage history of a web application; detecting a software error event associated with the web application and providing a signal in response thereto; and outputting stored usage history information in response to the signal, via the transferring step.

The stored usage history information is provided to, i.e., output to, an incident file, e.g., as maintained by the incident file repository 38, which is accessible via error analysis software 40-44. The usage history information includes one or more records characterizing a one or more end user interactions with a web application, such as the first web application 30 and/or the second web application 32. The one or more records include an ECID and may include additional information, such as a user interface component identification number, enabling identification of a web application associated with the particular user interaction or click.

Usage history associated with a particular end user's interaction with a web application may be stored for a time interval that is based on a size of a buffer 56, 58 and a number of logged instances of user interaction with one or more UI elements 18-22 associated with a web application 30, 32.

The administrator analysis software 44 provides one or more administrator user options for enabling an administrator to configure the size of the buffer 56, 58. Buffer size may be independently adjusted for one or more end users of one more web applications communicating with the usage history controller 34, e.g., by independently adjusting the sizes of the different buffers 56, 58. The administrator analysis software 44 may also include computer code adapted to enable correlating usage history information with additional diagnostics information.

FIG. 2 illustrates an example format of a usage history record 150 of an incident file usage history dump 60 generated by the system 10 of FIG. 1. The format of the usage history dump record 150, also called a click-history record, includes a value column 152 and a corresponding value-description column 154.

For the purposes of the present discussion, a click history record may be any file or collection of data pertaining to history of usage (i.e., usage history) of an application, such as a web application. Hence, a click history record is not limited to cataloging information pertaining only to mouse clicks applied by a user to a user interface associated with an application. In general, the terms click history and usage history are employed interchangeably herein.

The value column 152 includes various values, such as time stamp, username, application name, thread ID, ECID 156, session ID, UI component ID 158, UI component display name, UI component type, UI click type, UI window ID 160, UI view Id 162, UI region ID, 164, UI region name 166, and so on, characterizing a particular end user interaction with a user interface of a web application. In an actual usage history dump record, the description column 154 will include actual values, e.g., identification numbers, times, names, and so on, for the named values in the value column 152.

Certain values 158-166 identified in the value column 152, can be used to map a click back to the application source, i.e., to identify the application source to facilitate further error diagnosis and resolution.

FIG. 3 is a flow diagram of an example method 190 adapted for use with the embodiments of FIGS. 1-2. The example method 190 is adapted to facilitate diagnosing an error during a user operation in a web application. The method 190 is executed by a server system that also executes a web application or portion thereof.

The method 190 includes a first step 192, which involves recording user operations during a user's interaction with the web application.

A second step 194 includes storing the user operations in a click history record (e.g., usage history record) in a primary memory device, such as one or more of the buffers 56, 58 of FIG. 1.

A third step 196 includes determining that an error has occurred during the user's interaction with the web application.

A fourth step 198 includes transferring at least a portion of the click history record to a secondary memory device, such as the incident file repository 38, in response to the determination made in the third step 196.

A fifth step 200 includes maintaining correlation information in association with the click history information maintained in the click history record or portion thereof.

For the purposes of the present discussion, correlation information may include any data or information (e.g., ECID) that is usable to match files or other data to a particular event, such as error detection. Examples of other data include information in an incident report; information from debugging software; information from legacy software diagnostics tools, and so on.

A sixth step 202 includes identifying at least one other record by using the correlation information. Another record may include, for example, one or more records of the other dumps 62 of the incident file repository 38. The one or more records may include information pertaining to one or more server access logs, thread dumps, diagnostic error logs, metrics dumps, and so on. The correlation information may include an ECID to match logs, reports, etc., including the click history.

A seventh step 204 includes providing the click history record and at least one other record to analysis software accessible to a human analyst, to facilitate error diagnosis.

Although the description has been described with respect to particular embodiments thereof, these particular embodiments are merely illustrative, and not restrictive. For example, while certain embodiments are discussed herein primarily with reference to server-side error detection and usage history collection, embodiments are not limited thereto. For example, embodiments may also receive input from client-side usage history tracking mechanisms, such as client-side usage history buffers. A client-side usage history buffer may provide client-side usage history information and client-device diagnostics to a server-side usage history controller and/or incident files for use by server-side analysis tools, without departing from the scope of the present teachings.

Furthermore, while only one client device is shown in the figures, user history associated with multiple client devices and web applications associated with one or more users may also be monitored and tracked via a server-side usage history controller and accompanying buffer. In addition, multiple web applications running on multiple server systems (e.g., provided via different websites) may feed a usage history controller and accompanying usage history buffer system, enabling cross-domain comparisons and analysis of errors emerging from similar web applications running on different server systems.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for diagnosing an error during a user operation in a web application, the method executed, at least in part, by a server system, wherein the server system also executes, at least in part, a web application, the method comprising:

recording user operations during a user's interaction with the web application;

storing the user operations in a click history record in a primary memory device, wherein the click history record includes user interaction information characterizing a user's particular interactions with the web application prior to an error condition being detected;

determining that an error has occurred during the user's interaction with the web application;

in response to the determining, transferring at least a portion of the click history record including a portion of the user interaction information to a secondary memory device;

using at least some of the user interaction information transferred to correlate the click history record with at least one other record created prior to the error occurring that is independent of the click history record, and is applicable to diagnosing the cause of the error; and providing the click history record and the at least one other record to a human analyst so that the error can be diagnosed.

2. The method of claim 1, wherein the method includes facilitating characterizing a software error by performing the following:

tracking and storing information pertaining to usage history of a web application via the recording and storing steps prior to detecting the error;

detecting a software error event associated with the web application and providing a signal in response thereto via the determining step; and outputting stored usage history information in response to the signal, via the transferring step.

3. The method of claim 2, wherein outputting includes outputting the stored usage history information to an incident file, wherein the incident file is accessible via error analysis software.

4. The method of claim 3, wherein the usage history information includes one or more records characterizing one or more user interactions with a web application prior to the software error event being detected.

5. The method of claim 4, wherein the one or more records includes an Execution Context Identification Number (ECID).

6. The method of claim 4, wherein the one or more records includes one or more items identifying a web application associated with the particular user interaction.

7. The method of claim 6, wherein the one or more items include a user interface component identification number.

8. The method of claim 2, wherein the tracking and storing includes storing usage history information for a time interval prior to the software error event being detected.

9. The method of claim 8, wherein tracking and storing includes storing the usage history in a buffer.

10. The method of claim 9, further including determining the time interval based on a size of a buffer and a number of logged instances of user interaction with one or more UI elements associated with a web application.

11. The method of claim 10, further including providing an administrator user option to configure the size of the buffer.

12. The method of claim 9, further comprising retrieving usage history information from the buffer and storing the usage history in an incident file accessible to one or more error analysis tools.

13. The method of claim 12, wherein the one or more error analysis tools includes software adapted to enable correlating the usage history information with additional diagnostics information.

14. The method of claim 13, further including employing an Execution Context Identification Number (ECID) associated with the usage history information and associated with the additional diagnostics information to match the usage history information with the additional diagnostics information.

15. The method of claim 14, wherein the additional diagnostics information includes a thread dump.

16. The method of claim 14, wherein the additional diagnostics information includes a diagnostic error log.

17. The method of claim 14, wherein the additional diagnostics information includes a metrics dump.

18. The method of claim 14, wherein the additional diagnostics information includes performance data associated with the server system and further includes one or more server access logs.

19. An apparatus comprising:

a digital processor coupled to a display and to a processor-readable storage device, wherein the processor-readable storage device includes one or more instructions executable by the digital processor to perform the following acts:

recording user operations during a user's interaction with the web application;

storing the user operations in a click history record in a primary memory device, wherein the click history record includes user interaction information characterizing a user's particular interactions with the web application prior to an error condition being detected;

determining that an error has occurred during the user's interaction with the web application;

in response to the determining, transferring at least a portion of the click history record including a portion of the user interaction information to a secondary memory device;

using at least some of the user interaction information transferred to correlate the click history record with at least one other record created prior to the error occurring that is independent of the click history record, and is applicable to diagnosing the cause of the error; and providing the click history record and the at least one other record to a human analyst so that the error can be diagnosed.

20. A processor-readable non-transitory storage device including instructions executable by a digital processor, the processor-readable storage device including one or more instructions for:

recording user operations during a user's interaction with the web application;

storing the user operations in a click history record in a primary memory device, wherein the click history record includes user interaction information characterizing a user's particular interactions with the web application prior to an error condition being detected;

determining that an error has occurred during the user's interaction with the web application;

in response to the determining, transferring at least a portion of the click history record including a portion of the user interaction information to a secondary memory device;

using at least some of the user interaction information transferred to correlate the click history record with at least one other record created prior to the error occurring that is independent of the click history record, and is applicable to diagnosing the cause of the error; and providing the click history record and the at least one other record to a human analyst so that the error can be diagnosed.

* * * * *

UNITED STATES PATENT AND TRADEMARK OFFICE
CERTIFICATE OF CORRECTION

Page 1 of 1

PATENT NO.         : 9,009,544 B2
APPLICATION NO.    : 13/852982
DATED              : April 14, 2015
INVENTOR(S)        : Cook et al.

It is certified that error appears in the above-identified patent and that said Letters Patent is hereby corrected as shown below:

In the Specification

In column 7, line 45, delete "overwritten" and insert -- overwritten. --, therefor.

Signed and Sealed this
Sixteenth Day of February, 2016

Michelle K. Lee
*Director of the United States Patent and Trademark Office*